United States Patent [19]

Wood

[11] 4,266,799
[45] May 12, 1981

[54] ADJUSTABLE TRAILER HITCH DEVICE

[76] Inventor: Leonard A. Wood, P.O. Box 750, North Bay, Ontario, Canada, P1B 8J8

[21] Appl. No.: 52,304

[22] Filed: Jun. 26, 1979

[30] Foreign Application Priority Data

May 18, 1979 [CA] Canada .................................. 327919

[51] Int. Cl.³ .............................................. B60D 1/06
[52] U.S. Cl. ................. 280/490 R; 280/482; 280/495
[58] Field of Search ............... 280/490 R, 490 A, 482, 280/491 R, 491 A, 495, 498, 511

[56] References Cited

U.S. PATENT DOCUMENTS

| | | | |
|---|---|---|---|
| 2,635,891 | 4/1953 | Cook | 280/495 |
| 2,847,232 | 8/1958 | Graham | 280/490 R |
| 3,177,008 | 4/1965 | Steele | 280/490 R |
| 3,649,046 | 3/1972 | Mathisen | 280/490 R |
| 3,664,686 | 5/1972 | Anderson | 280/490 R |
| 4,033,601 | 7/1977 | Lindahl et al. | 280/490 R |

FOREIGN PATENT DOCUMENTS 976578 10/1975 Canada .................................. 280/490 R Primary Examiner—Randolph A. Reese
Assistant Examiner—Donn McGiehan
Attorney, Agent, or Firm—Cushman, Darby & Cushman

[57] ABSTRACT

In an adjustable trailer hitch device, a shank is adjustably receivable in a tube of a towing vehicle and terminates in an apertured plate inclined to the vertical. A second apertured plate is attachable by bolts to the first plate in any of a plurality of different positions to provide a plurality of different heights relative to the shank of a towing ball supported from the second plate. The shank and plates are invertible relative to the tube and the towing ball to double the number of heights which the ball may have with respect to the vehicle. The inclination of the plates provides desired clearances for a trailer coupling and allows use of less material without reducing the strength and rigidity of the device.

12 Claims, 6 Drawing Figures

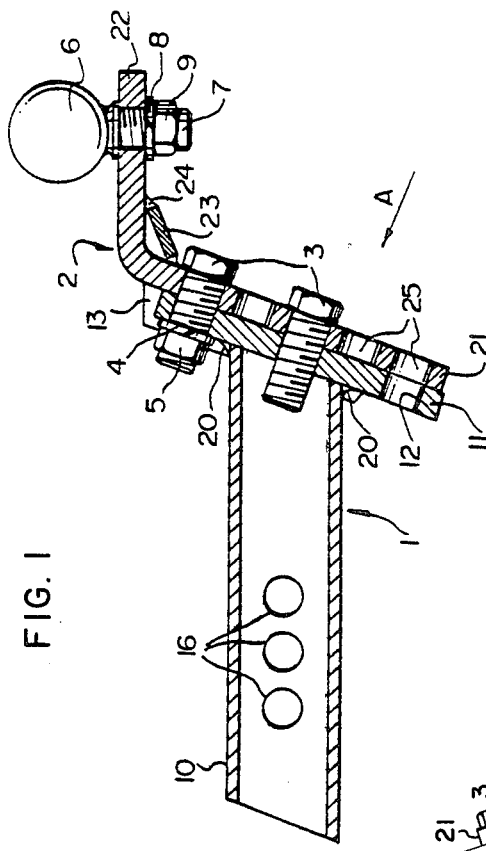
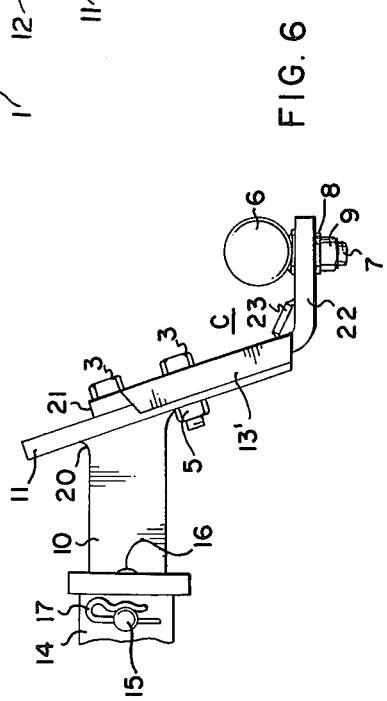

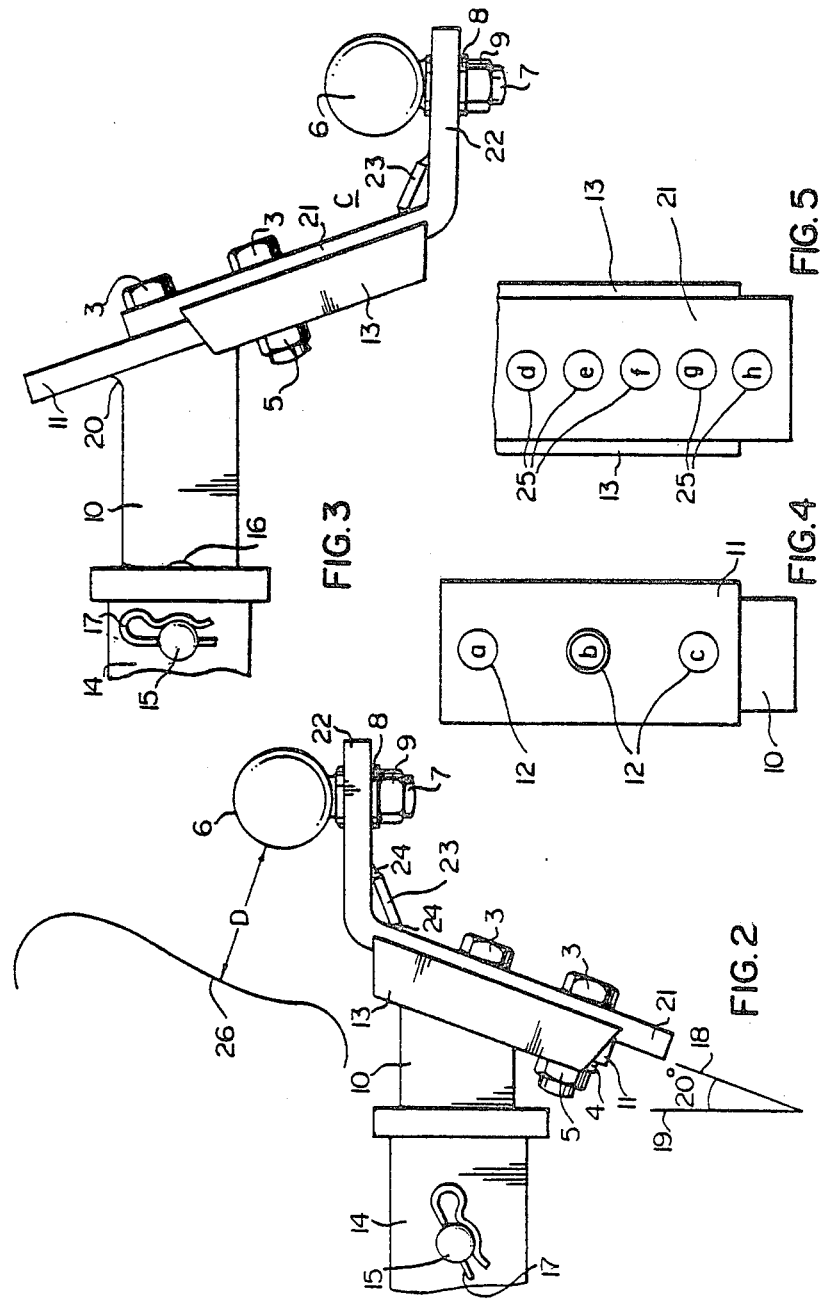

ADJUSTABLE TRAILER HITCH DEVICE

This invention relates to an adjustable trailer hitch device which comprises two relatively movable members which can be secured together in any of a plurality of different positions to provide different hitch heights.

Such devices are known, for example from Canadian Pat. No. 976,578, which discloses a device having a shank portion, which is receivable in a socket tube permanently fixed to a vehicle, and a ball carrying portion which carries a conventional towing ball. Each portion has a plurality of bolt holes which are spaced apart from one another in a vertical direction so as to provide a plurality of positions at which the portions can be attached to one another, and hence to provide a plurality of possible trailer hitch heights for the vehicle. As disclosed in this reference there are two such positions, and in addition the shank portion can be inverted relative to the ball carrying portion, so that a total of four different heights of the ball relative to the vehicle can be provided.

Such a known device does not, however, provide sufficient versatility to enable it to be used with any combination of vehicle and trailer whilst ensuring that the ball is at the correct height to achieve a desired load balance between the trailer and towing vehicle. For example, in the case of a vehicle such as a truck having a relatively large ground clearance the socket tube attached to the vehicle is much higher than it is in the case of a car having a relatively small ground clearance, and a single device as disclosed in Canadian Pat. No. 976,578 can not conveniently be used with both of these types of vehicles to provide a common height of the towing ball, as is desirable if different vehicles are to be used for towing a particular trailer. The trailer must be level to ensure smooth hauling and to avoid undue strain. In addition, vehicle suspension systems tend to settle with age and use, thereby reducing the height of a trailer hitch attached to a vehicle. For these reasons, an arrangement providing a wide variety of height adjustments is desirable.

In known devices such as that disclosed in Canadian Pat. No. 976,578, a relatively long part of the shank portion may have to extend between the socket tube attached to the vehicle and the point of attachment to the ball carrying portion in order that the ball is sufficiently spaced from parts of the vehicle, such as the vehicle's rear bumper. In order that the shank portion is sufficiently strong it is generally of solid cross-section, using relatively large amounts of metal and thereby rendering the known device expensive to produce.

An object of this invention is to provide an improved adjustable trailer hitch device which in particular can be used with a wide variety of vehicle and trailer combinations.

According to this invention there is provided an adjustable trailer hitch device comprising:

a first member comprising an elongate shank, attachable to a towing member of a vehicle, and a first plate united with the shank at one end thereof, the first plate being disposed obliquely to the length direction of the shank, so as to be inclined with respect to the vertical when the shank is attached to the towing member, and having a plurality of spaced holes therein;

a second member comprising a second plate and a support to which a towing ball can be attached, the second plate being united with the support and being disposed obliquely with respect thereto, the second plate having a plurality of spaced holes therein;

the plates and the holes therein being so arranged that the second plate can be positioned adjacent the first plate, with holes in the plates aligned, in any of a plurality of positions providing different heights of the support with respect to the shank; and Means for securing the second plate to the first plate through the aligned holes in any of the plurality of positions.

The first plate is conveniently disposed in a plane which is inclined at an angle of about 20° to a plane which is perpendicular to the length direction of the shank, but this angle is not particularly critical.

The shank preferably includes a plurality of transverse holes spaced apart along its length, by means of each of which the shank is attachable to the towing member in either of two relatively inverted positions. In addition, the support preferably includes a hole therein through which a towing ball can be attached in either of two relatively inverted positions. The combination of these features makes possible a very wide range of heights of the towing ball with respect to the shank. The number of possible height positions within this wide range can conveniently be made large if the holes in the second plate are equally spaced in a line with a pitch which is an integral fraction of the spacing of holes in the first plate. For example, there may be three holes in the first plate and five holes in the second plate.

The invention will be further understood from the following description by way of example of an embodiment thereof with reference to the accompanying drawings, in which:

FIG. 1 illustrates a longitudinal cross-sectional view of an adjustable trailer hitch device assembled in a first position;

FIG. 2 illustrates the device assembled in a second position, showing its location with respect to parts of a towing vehicle having a relatively small ground clearance;

FIG. 3 illustrates the device assembled in a third position, showing its location with respect to part of a towing vehicle having a relatively large ground clearance;

FIGS. 4 and 5 illustrate parts of the device seen in the direction of an arrow A in FIG. 1, and FIG. 6 is a view similar to FIG. 3 but on a reduced scale and illustrating a modification where the flanges are secured to the first plate rather than the second plate.

Referring to the drawings, the adjustable trailer hitch device shown therein includes a first member 1 and a second member 2 which can be joined together in different positions by bolts 3, a spring washer 4, and a nut 5. A conventional towing ball 6 having a threaded stud 7 can be attached to the second member 2 by means of a spring washer 8 and a nut 9.

The first member 1 consists of an elongate shank 10 which in this embodiment is of tubular square cross-section, and a first plate 11 having three equally spaced holes 12 therein. The shank 10 is arranged in known manner to be slidably receivable in a socket tube 14 of a towing vehicle; the tube 14 is for example part of an assembly which is welded or bolted to the chassis of the vehicle. The shank 10 can be fixed in the tube 14 in any one of three different longitudinal positions by means of a pin 15 which extends through holes in the tube 14 and through a selected one of a plurality of, in this case three, transverse holes 16 provided in the shank 10. The pin 15 is fixed in position by a clip 17 in known manner. The holes 16 are provided symmetrically on the shank 10, and the hole in the tube 14 is symmetrically provided in this tube 14, so that in addition the shank 10 can be fixed in the tube 14 using each hole 16 in either of two relatively inverted positions as shown in FIGS. 2 and 3.

The first plate 11 is welded to an end of the shank 10 so that it lies in a transverse plane 18 (FIG. 2) which is inclined at an angle of about 20° to a plane 19 which is perpendicular to the length direction of the shank 10. The ends of the shank 10 are cut to this angle and the welding is effected to form welds 20 (FIG. 1) to form a strong joint. The central one of the three holes 12 in the plate 11 is threaded as shown in FIG. 4 to receive a bolt 3 as shown in FIG. 1; the bolt 3 thus extends into the interior of the tubular shank 10.

The second member 2 consists of a second plate 21, two flanges 13, and a support 22 which is constituted by a continuation of the plate 21 inclined at an obtuse angle thereto. In this embodiment this angle is 110° so that as shown in FIGS. 1 to 3 when in use the plates 11 and 21 are bolted together the support 22 is horizontal. A reinforcing member 23 extends transversely of the plate 21 and support 22 within this angle and is welded at its edges to the plate 21 and support 22 to form welds 24. The flanges 13 are similarly welded to the sides of the plate 21 to strengthen the second member 2, particularly to resist bending of the plate 21, and to form guides between which the first plate 11 can be received as can be seen in FIGS. 2 and 3. The support 22 is provided with a hole through which the stud 7 of the towing ball 6 passes to secure the ball 6 to the support 22 in the manner already described. As shown best in FIG. 5, the first plate 11 has a width such that it is slidably receivable against the second plate 21 within the guides formed by the flanges 13. The second plate 21 includes five equally spaced holes 25 arranged in a line as shown in FIG. 5. The pitch of these holes 25 is arranged to be an integral fraction, in this case ½, of the pitch of the holes 12 in the plate 11. A modification of the present invention is disclosed in FIG. 6. In this modification, the flanges 13' are welded to the sides of the first plate 11 and extend outwardly away from the elongated shank 10. Flanges 13' provide guides therebetween for receiving the second plate 21 when the second plate is positioned as shown or is positioned as shown in FIG. 2.

It should be appreciated that the plates 11 and 21 can be positioned relative to one another, with at least two holes in each plate aligned with one another, in any one of five different positions. In FIG. 4 the holes 12 in the plate 11 are referenced a, b, and c, and in FIG. 5 the holes 25 in the plate 21 are referenced d, e, f, g, and h. The five different positions correspond to alignment of the holes a-f, b-h (this is the position shown in FIG. 3); a-e, b-g; a-d, b-f, c-h (this is the position shown in FIG. 1); b-e, c-g (this is the position shown in FIG. 2); and b-d, c-f. Each of these different positions corresponds to a respective height of the towing ball 6 relative to the shank 10 and hence the socket tube 14 of the towing vehicle. However, the shank 10 can be inverted with respect to the socket tube 14 as discussed above, so that in fact each of the different relative positions of the plates 11 and 21 provides two different heights of the ball 6 relative to the tube 14. The dimensions of the device are selected to be such that, with the holes b–d and c–f aligned, inversion of the shank 10 in the tube 14 together with inversion of the ball 6 on the support 22 causes the relative height of the ball 6 to change by substantially the same amount as it would if the plates 11 and 21 were moved from one aligned-hole position to the next. Thus, a continuous range of ten different and equally spaced relative heights of the ball 6 is provided.

FIG. 2 illustrates the use of the device with a towing vehicle such as a car, having a relatively small ground clearance. In this case the tube 14 is generally located at a relatively low level just below a rear bumper of the vehicle, which bumper is schematically illustrated and referenced 26 in FIG. 2. As can be seen, the bumper 26 rises upwardly and rearwardly from above the tube 14. The shank 10 is fixed in the tube 14 by means of the pin 15 and split pin 17 passing through an appropriate one of the holes 16 so that the plate 11 is as far forwards as possible, and so that this plate 11 also rises upwardly and rearwardly. This ensures that only a relatively short portion of the shank 10 extends from the tube 14, providing a strong and rigid arrangement even though the shank 10 is tubular. The plate 21 is then secured to the plate 11, by means of a bolt 3 passing into the central one of the holes 12 in the plate 11 and a bolt 3 passing into one of the other holes 12 and secured by the washer 4 and nut 5, in that one of the five possible positions which provides the desired height above the ground of the towing ball 6. As can be seen from FIG. 2, a wide range of movement of the ball 6 is possible without any substantial change in the distance D between the ball 6 and the bumper 26, which distance D is necessary to provide space for coupling of a trailer to the ball 6. This feature arises because the bumper 26 and the plate 11 are inclined to the vertical by approximately the same angle of 20°. It can be seen that if, as in the prior art, the ball 6 were merely moved vertically to provide the necessary height adjustment, then the distance D would be substantially decreased on raising the ball, making it necessary then to withdraw the shank 10 further from the tube 14.

FIG. 3 illustrates the use of the device with a towing vehicle, such as a truck, having a relatively large ground clearance. In this case the shank 10 is inverted relative to its position in FIG. 2, and fixed in the tube 14 as described above. FIG. 3 shows a different longitudinal position of the shank 10 relative to that shown in FIG. 2, for purposes of illustration. The plate 21 is not inverted relative to the plate 11, but is shown in a different position from that of FIGS. 1 and 2 again for purposes of illustration. In this case, the ball 6 is inverted relative to the support 22 from its position shown in FIGS. 1 and 2. Again in this arrangement the height of the ball 6 can be adjusted through a wide range, as already described, to provide a desired height of the ball 6 above the ground. Because in this case the plate 21 slopes upwardly and forwardly away from the ball 6, the base of the ball 6 can be positioned closer to the junction between the plate 21 and the support 22 than it could be if the plate 21 were vertical, whilst still providing the necessary clearance C between the ball 6 and the plate 21 and bolts 3, for a trailer coupling.

It should be apparent from the above description that the device of the present invention can be made stronger and more rigid, and/or of thinner and hence less expensive material, than prior art arrangements by virtue of the inclination of the plates 11 and 21 to the vertical. At the same time, these improvements are achieved whilst providing a very wide range of adjustment of the towing ball with respect to the tube of a towing vehicle.

The present device is, therefore, both economical and very versatile.

Numerous modifications, variations, and adaptations may be made to the device as described above without departing from the scope of the invention as defined in the claims. For example, the shank 10 and tube 14 could be round instead of square, and the shank could be solid instead of being tubular. The flanges 13 could be made integral with the plate 21. Different angles of the plates with respect to the vertical could be provided, and the support 22 could be other than horizontal. The reinforcing member 23 could be replaced by other reinforcing members such as webs between the plate 21 and support 22, and these could be provided separately from one another and joined together instead of being formed integrally as described. The parts of the device could be joined together in any other suitable manner, or the members could be formed as castings. Different numbers, arrangements, and relative pitches of the holes in the plates 11 and 21 could be provided, and other fixing arrangements of the plates to one another, and of the ball to the support, could be provided. For example, all of the holes in the plate 11 could be threaded so that the plate 21 could be attached using only bolts 3; similarly the hole in the support 22 could be threaded to receive the stud 7 of the ball 6 to enable the washer 8 and nut 9 to be dispensed with.

I claim:

1. An adjustable trailer hitch device for attachment to a towing member of a vehicle comprising:
   a first member including an elongated shank attachable to the towing member of the vehicle and a first elongated flat plate united with said shank at one end of said shank, said first plate being disposed obliquely to a longitudinal axis of said shank so as to be inclined with respect to a vertical when said shank is attached to the towing member, said first plate having a plurality of spaced holes therein;
   a second member including a second elongated flat plate and a support to which a towing ball can be attached, said support being rigidly united with said second plate at an obtuse angle thereto and said support being disposed in a plane parallel to the longitudinal axis of said shank when said second plate is secured to said first plate, said second plate having a plurality of spaced holes therein;
   said first and second plates and said holes therein being so arranged that said second plate can be positioned against said first plate with holes in said first and second plates aligned in any of a plurality of positions to provide different heights for said support with respect to said shank; and
   means for securing said second plate to said first plate through the aligned holes in any of the plurality of positions.

2. A device as claimed in claim 1 wherein the elongated shank includes a transverse hole by means of which the shank is attachable to the towing member in either of two relatively inverted positions.

3. A device as claimed in claim 1 wherein the elongated shank includes a plurality of transverse holes spaced apart along its length, by means of each of which the shank is attachable to the towing member in either of two relatively inverted positions.

4. A device as claimed in claim 1 wherein the second member further comprises two flanges united with the second plate and disposed one on each side of the second plate, the flanges strengthening the second plate and forming guides for the first plate which can be positioned therebetween.

5. A device as claimed in claim 1 wherein the holes in the second plate are equally spaced in a line with a pitch which is an integral fraction of the spacing of holes in the first plate.

6. A device as claimed in claim 1 wherein the first plate has three holes equally spaced in a line therein and the second plate has five holes equally spaced in a line therein.

7. A device as claimed in claim 1 wherein the first plate is disposed in a plane which is inclined, with respect to a plane which is perpendicular to the length direction of the shank, at an angle of about 20°.

8. A device as claimed in claim 1 and including a towing ball attached to the support.

9. An adjustable trailer hitch device for attachment to a towing member of a vehicle comprising:
   a first member including an elongated shank attachable to the towing member of the vehicle and a first plate united with the shank at one end thereof, said first plate being disposed obliquely to the length direction of the shank so as to be inclined with respect to a vertical when said shank is attached to the towing member, said first plate having a plurality of spaced holes therein;
   a second member comprising a second plate and a support to which a towing ball can be attached, said second plate being united with said support and said support being a continuation of said second plate and inclined at an obtuse angle with respect to said second plate, said second plate having a plurality of space holes therein;
   said plates and said holes therein being arranged so that said second plate can be positioned adjacent said first plate with the holes in the plates aligned in any of a plurality of positions providing different heights of said support with respect to said shank; and
   means for securing said second plate to said first plate through aligned holes in any of the plurality of positions.

10. A device as claimed in claim 9 wherein the second member further comprises a reinforcing member united with the second plate and the support and extending transversely of the second member within said obtuse angle.

11. A device as claimed in claim 10 wherein the support includes a hole therein through which a towing ball can be attached in either of two relatively inverted positions.

12. An adjustable trailer hitch device for attachment to a towing member of a vehicle comprising:
   a first member comprising an elongated shank attachable to the towing member of the vehicle and a first plate united with the shank at one end thereof, said first plate being disposed obliquely to the length direction of the shank so as to be inclined with respect to a vertical when the shank is attached to the towing member, said first plate having a plurality of spaced holes therein, two flanges united with said first plate and disposed one on each side of the first plate, said flanges forming guides;
   a second member comprising a second plate arranged to be positioned between the flanges of the first plate and a support to which a towing ball can be attached, said second plate being united with said support and said support being a continuation of said second plate and inclined at an obtuse angle with respect to said second plate, said second plate having a plurality of spaced holes therein, and said second member further comprising a reinforcing member united with said second plate and said support and extending transversely of said second member within said obtuse angle;

said plates and said holes therein being arranged so that said second plate can be positioned adjacent said first plate between the flanges thereon with the holes in the plates aligned in any of a plurality of positions providing different heights of said support with respect to said shank; and means for securing said second plate to said first plate through aligned holes in any of the plurality of positions.

* * * * *